United States Patent [19]

Lauro

[11] 4,366,027
[45] Dec. 28, 1982

[54] DEVICE FOR DISTILLATION OR CONCENTRATION OF A SOLUTION AND MORE PARTICULARLY FOR DESALINATION OF A SALINE SOLUTION SUCH AS SEA WATER

[75] Inventor: Fernand Lauro, Grenoble, France

[73] Assignee: Commissariat a l'Energie Atomique, Paris, France

[21] Appl. No.: 298,740

[22] Filed: Sep. 2, 1981

Related U.S. Application Data

[63] Continuation of Ser. No. 98,056, Nov. 28, 1979, abandoned.

[30] Foreign Application Priority Data

Nov. 29, 1978 [FR] France .................. 78 33717

[51] Int. Cl.$^3$ ............... B01D 1/26; B01D 3/02
[52] U.S. Cl. .................... 202/174; 159/17 R
[58] Field of Search .................. 203/71, 88; 202/170–174; 159/17 R, 17 P, 17 VS, 17 C, 18

[56] References Cited

U.S. PATENT DOCUMENTS 3,351,120 11/1967 Goeldner et al. .................. 202/174
3,486,985 12/1969 McGrath .......................... 203/88

Primary Examiner—Frank Sever

[57] ABSTRACT

Distillation or concentration of a solution is carried out within a series of chambers $C_1, C_2 \ldots C_n$ in which the pressures and the temperatures are of progressively decreasing value. Evaporation of the solution takes place within chamber $C_1$ by indirect heat exchange with an auxiliary fluid. Evaporation of the solution takes place within each chamber $C_2$ to $C_n$ by indirect heat exchange on the one hand with the vapor formed within the preceding chamber in order to condense the vapor and on the other hand with the auxiliary fluid which is continuously circulated from chamber $C_1$ to chamber $C_n$, the vapor formed within chamber $C_n$ being in turn condensed.

7 Claims, 2 Drawing Figures

DEVICE FOR DISTILLATION OR CONCENTRATION OF A SOLUTION AND MORE PARTICULARLY FOR DESALINATION OF A SALINE SOLUTION SUCH AS SEA WATER

This is a continuation of application Ser. No. 098,056, filed Nov. 28, 1979, now abandoned.

This invention relates to a method and a device for distillation or concentration of a solution, more particularly in the field of desalination of a saline solution and especially sea water.

In more precise terms, the present invention relates to a method of distillation of the type in which the solution is evaporated in a series of chambers $C_1$ to $C_n$ at progressively decreasing temperatures and pressures, this evaporation being carried out within each chamber except for the first by heat exchange with the vapor formed within the preceding chamber.

In the known methods of this type such as those described in Luxemburg Pat. No. 67/919, French Pat. Nos. 1,530,435, 2,155,984 and 2,348,725, evaporation of the solution is carried out within the first chamber by heat exchange with a vapor which has been brought to a suitable temperature and consists, for example, of steam at a temperature of 100° C., the steam being subsequently recycled to a heat source in order to be subsequently reintroduced into the first chamber at the appropriate temperature.

The present invention is directed to a method of distillation or concentration of a solution which makes it possible to attain satisfactory distillate production rates by employing as a heat source an auxiliary fluid which can be derived in particular from the same source as the solution to be distilled.

The method according to the invention for distillation of a solution within a series of chambers $C_1$, $C_2$, . . . $C_n$ in which the pressures and the temperatures are of progressively decreasing value from the chamber $C_1$ to the chamber $C_n$ essentially consists in carrying out within chamber $C_1$ an evaporation of the solution by indirect heat exchange with an auxiliary fluid and by carrying out within each chamber $C_2$ to $C_n$ an evaporation of the solution by indirect heat exchange on the one hand with the vapor formed within the preceding chamber in order to condense said vapor and on the other hand with said auxiliary fluid, said auxiliary fluid being continuously circulated from chamber $C_1$ to chamber $C_n$ and the vapor formed within chamber $C_n$ being in turn condensed. Condensation of the vapor of chamber $C_n$ can take place either within the chamber itself or within a condenser located outside said chamber.

The method according to the invention advantageously utilizes the association of two heat exchange processes within each chamber except for the first, namely a heat exchange with an auxiliary fluid and a heat exchange with the vapor formed within the preceding chamber. Taking into account the complementary addition of heat by the auxiliary fluid within each chamber, the invention thus has the advantage of achieving satisfactory rates of distillate production. Moreover, this method offers the advantage of being adapted to distillation from auxiliary fluids constituted by heat rejections from which practically the entire quantity of heat can thus be recovered by cooling said fluids successively within the chambers $C_1$ to $C_n$.

According to the invention, the auxiliary fluid which passes out of the first chamber $C_1$ is not in fact recycled to a heat source but employed within the following chambers $C_2$ to $C_n$ in order to produce an additional quantity of vapor within each chamber, thus making it possible to carry out suitable cooling of said auxiliary fluid at the same time and thus to utilize this fluid over a wide temperature range.

It should be noted at this juncture that the method according to the invention as defined in the foregoing is such that the vapor formed within each chamber mainly results from evaporation of the solution by application of heat obtained from the vapor of the preceding chamber and of heat supplied by said auxiliary fluid, given the fact that self-vaporization takes place by expansion of the solution as it passes from one chamber to the next and possibly at the time of introduction of said solution into the chamber $C_1$ as a function of the temperature at which it is admitted into this latter.

In a first embodiment of the method according to the invention, the heat exchange within a chamber between the solution and the auxiliary fluid is carried out by establishing a flow of solution in the form of a film on the surface of a heat exchanger through which said fluid is circulated.

Similarly, the heat exchange within each chamber $C_2$ to $C_n$ between the solution and the vapor of the preceding chamber is carried out by establishing a flow of solution in the form of a film on the surface of a condenser through which the vapor aforesaid passes. In more precise terms, the flow of solution is established successively on the condenser and on the exchanger within each chamber $C_2$ to $C_n$.

Furthermore, the aforementioned flow of solution in the form of a thin film on the surface of the heat exchangers and of the condensers can be established in accordance with two separate and distinct modes.

In a first mode, the solution which passes into the installation is sprayed onto the exchangers and the condensers.

In a second mode, a fraction of the non-vaporized solution of at least one of the chambers is sprayed onto the exchangers and the condensers, then recycled within the installation, thus involving the need to supply a make-up quantity of solution. The make-up quantity of solution which compensates for the distillate and the concentrate can be introduced at any point of the solution circuit within the installation, preferably at the base of the hottest chamber.

In a second embodiment of the method according to the invention, indirect heat exchange between the solution and the auxiliary fluid is carried out in chamber $C_1$ by establishing within this latter a circulation of solution such that a heat exchanger through which the auxiliary fluid circulates is completely immersed in the solution within chamber $C_1$. Indirect heat exchange is carried out within each chamber $C_2$ to $C_n$ on the one hand between the solution and the vapor of the preceding chamber and on the other hand between the solution and the auxiliary fluid by establishing within each chamber $C_2$ to $C_n$ a circulation of solution such that, within each chamber, a heat exchanger through which the auxiliary fluid circulates and a condenser through which the vapor circulates are completely immersed in the solution.

It is also pointed out that, according to the invention, the solution to be processed and said auxiliary fluid can be supplied from one and the same source or from different sources.

In the event that the solution and the auxiliary fluid are obtained from different sources, it is advisable to preheat the solution. To this end, heat exchangers provided in the upper portion of the chambers are supplied in series with the solution which is circulated continuously through the chambers from chamber $C_n$ to chamber $C_1$.

The present invention is also directed to a device for distillation of a solution.

Said distillation device comprises a plurality of chambers $C_1$ to $C_n$ for vaporization of the solution and condensation of the vapor formed within the preceding chamber, the pressures and temperatures within said chambers being of progressively decreasing value from chamber $C_1$ to chamber $C_n$, a communication being established between said chambers for the flow of non-vaporized solution. The device is distinguished by the fact that the chamber $C_1$ comprises a heat exchanger in which an auxiliary fluid circulates, and that each chamber $C_2$ to $C_n$ comprises a condenser for the vapor of the preceding chamber and an exchanger in which the auxiliary fluid circulates, the exchangers of the chambers being adapted to be supplied in series from chamber $C_1$ to chamber $C_n$. A further distinctive feature lies in the fact that each chamber comprises means for contacting the solution to be processed with the surface of said heat exchangers and of said condensers, means for distributing the vapor formed in one chamber within the condenser of the following chamber and means for recovering the distillate produced within one chamber.

Preferably, the condensers placed within the chambers are located above the heat exchangers.

In a first embodiment of the device according to the invention, the means for contacting said solution with the surface of said heat exchangers and of said condensers are means for establishing a flow of solution in the form of a thin film on the surface of said heat exchangers and of said condensers.

In a second embodiment of the device according to the invention, the means for contacting said solution with the surface of said heat exchangers and of said condensers are means for establishing within the chambers a circulation of solution such that said heat exchangers and said condensers are completely immersed in said solution. Said means can comprise recycling means such as pumps for recycling to the chambers a fraction of the non-vaporized solution of at least one of said chambers.

When the solution is preheated, each chamber of the device according to the invention comprises a unit for preheating the solution in addition to said heat exchanger and said condenser, the preheaters of the chambers being adapted to be supplied in series from chamber $C_n$ to chamber $C_1$.

According to the invention, the means for establishing a flow of solution in the form of a thin film on the surface of the heat exchangers and of the condensers can comprise either means for spraying onto the surface of the heat exchangers and of the condensers the solution which is introduced directly into each chamber or means for spraying onto the surface of the heat exchangers and of the condensers a fraction of the non-vaporized solution of at least one of the chambers.

Further distinctive features and advantages of the present invention will become more clearly apparent from the following description of exemplified embodiments of an installation according to the invention for carrying out a distillation process and utilizing the method according to the invention for converting brackish water or brine such as sea water to drinking water.

In the following description, reference will be made to the accompanying diagrams in which.

Figure 1:
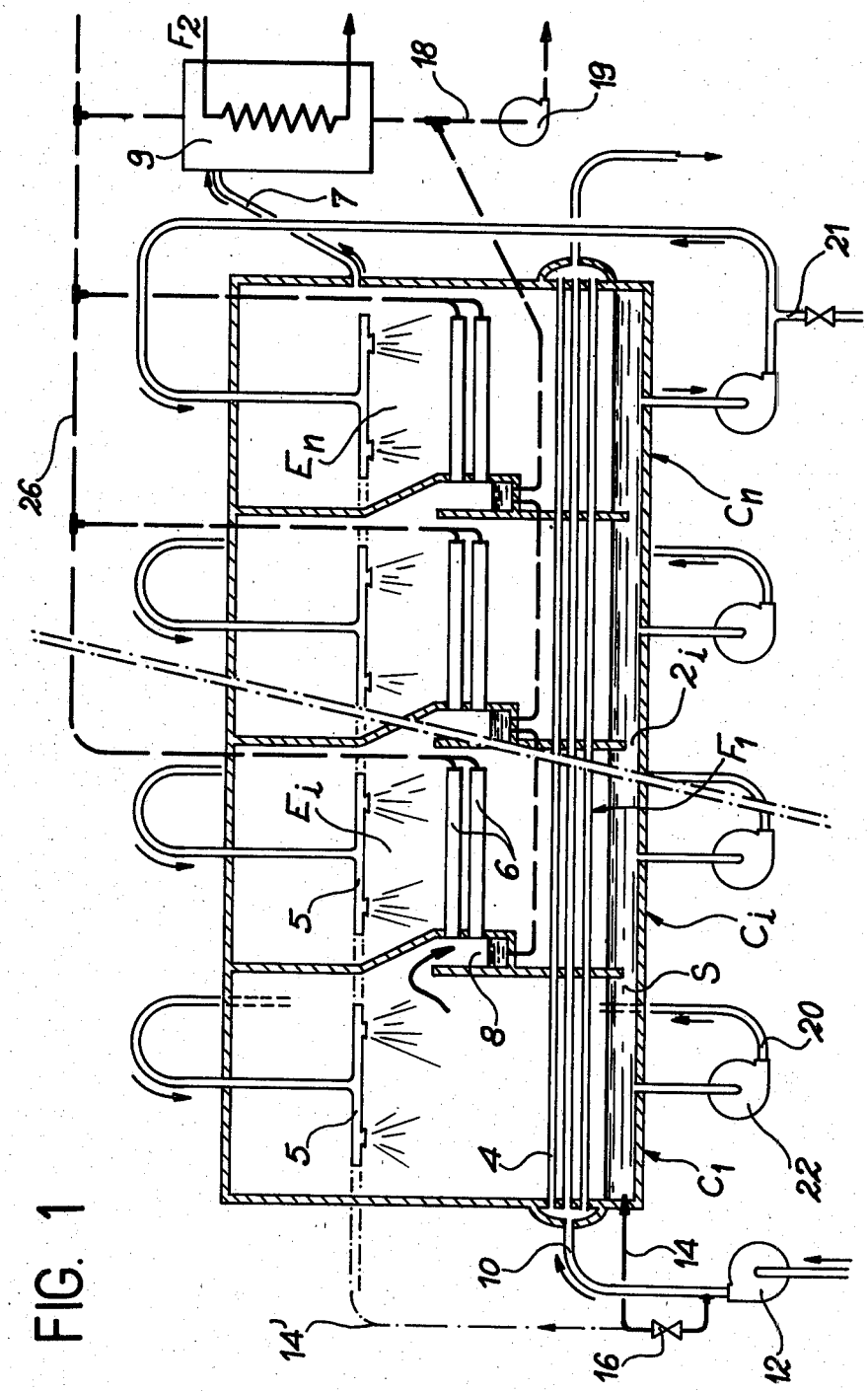
FIG. 1 is a first alternative embodiment illustrating the installation according to the invention in which the auxiliary fluid and the solution are obtained from the same source.

The installation shown in FIG. 1 comprises a certain number of chambers designated by the reference $C_i$ in which the first chamber $C_1$ is at the highest temperature whilst the last chamber $C_n$ is at the lowest temperature.

In a known manner, the chambers $C_i$ each have a space $E_i$ for evaporation of a solution S consisting of sea water in this example and communicate with each other by means of a passage $2_i$ through which a flow of solution is intended to pass.

According to one of the essential features of the invention, the evaporation space $E_i$ of each chamber $C_i$ is provided with a heat exchanger 4, for example of the tubular type in which a hot auxiliary fluid $F_1$ is circulated, and with a sea-water sprayer 5; and each of the chambers $C_2$ to $C_n$ is provided with a condenser 6. Each condenser 6 is interposed between the sprayer 5 and the heat exchanger 4 and opens at one end into a vapor distribution chamber 8 which communicates with the evaporation space of the preceding chamber and the lower portion of which serves to collect the distillate produced within the condenser. It is also apparent from FIG. 1 that the evaporation space $E_n$ of the chamber $C_n$ is put into communication via a pipe 7 with a condenser 9 through which a cold fluid $F_2$ is circulated.

It should be explained that the spraying process mentioned in this specification consists in projecting small droplets of solution onto the condensers 6 and onto the heat exchangers 4 or in sprinkling these latter with the solution.

Moreover, it is noted that the heat exchangers 4 are so arranged as to permit a flow of hot fluid $F_1$ in series through the set of chambers $C_i$.

It is further apparent from FIG. 1 that the installation comprises a pipe 10 for admitting the hot fluid $F_1$ into the heat exchanger 4 of the chamber $C_1$, said pipe 10 being fitted with a pump 12.

It is pointed out that, in the remainder of this specification, the term "fresh sea water" is intended to designate sea water which has freshly been introduced into the installation or a make-up quantity of sea water.

In order to supply the chambers with fresh sea water, an installation according to the invention preferably comprises a pipe 14 for the admission of said sea water into the chamber $C_1$. When the fluid $F_1$ is hot sea-water as in the exemplified embodiment of FIG. 1, the flow which supplies the chambers with fresh sea water can be constituted by a fraction of the flow which supplies the heat exchangers 4 with fluid $F_1$, in which case the pipe 14 is connected to the pipe 10 by means of a valve 16.

In the alternative embodiment of FIG. 1, each chamber $C_i$ is provided with a pipe 20 equipped with a pump 22 for recycling the brine contained therein to the sprayer 5 with which said chamber is equipped, a brine withdrawal 21 being provided in the pipe 20 of the chamber $C_n$ downstream of the pump 22, the make-up quantity being introduced through the pipe 14.

Furthermore, the condensate which accumulates within the chambers 8 and passes from one chamber to the next through a siphon is collected by the pipe 18 which is fitted with a pump 19 together with the condensate derived from the condenser 9.

Moreover, the installation according to the invention comprises in known manner a unit 26 for drawing-off the noncondensable vapor produced in each chamber and within the condenser 9 as shown in FIG. 1.

It is also pointed out that, by way of alternative, the chambers can be supplied with fresh sea water by supplying the sprayers 5 in series via the pipe 14' (shown in chain-dotted lines in FIG. 1), a communication being established for this purpose between the sprayers 5 of two adjacent chambers. It is noted, however, that this mode of supply does not permit independent adjustment of the spray discharge rate within each chamber and the rate of supply of the chambers with fresh sea water.

The principle of operation of the installation shown in FIG. 1 will now be explained.

It is recalled that evaporation of sea water within each of the chambers $C_i$ essentially takes place as a result of evaporation by means of the heat supplied by the vapor of the preceding chamber within the condensers 6 and by the hot fluid $F_1$ within the heat exchangers 4, and also as a result of evaporation by expansion of sea water which flows from one chamber to the next through the passages $2_i$.

A point worth noting is that, once the installation has attained operating equilibrium, the temperatures of the vapor within each chamber $C_1$ to $C_n$ (which are of decreasing value from chamber $C_1$ to chamber $C_n$) are dependent on the temperature of the fluid $F_1$ at the inlet of the installation, on the temperature of the fluid $F_2$ at the inlet of the condenser 9 and on the respective flow rates of the fluids $F_1$ and $F_2$. In each lower chamber, said temperatures are a few degrees lower than the temperatures of the fluid $F_1$ at the outlet of the chamber considered.

In the case of a given hot fluid $F_1$ and cold fluid $F_2$ and heat exchangers 4 and condensers 6 and 9 having given characteristics, the principle of operation of the installation is as follows.

The rates of flow of the fluids $F_1$ and $F_2$ are adjusted so as to obtain a given distillate production rate and the rate of flow of sea water through the chambers is adjusted to obtain a given brine concentration.

Figure 2:
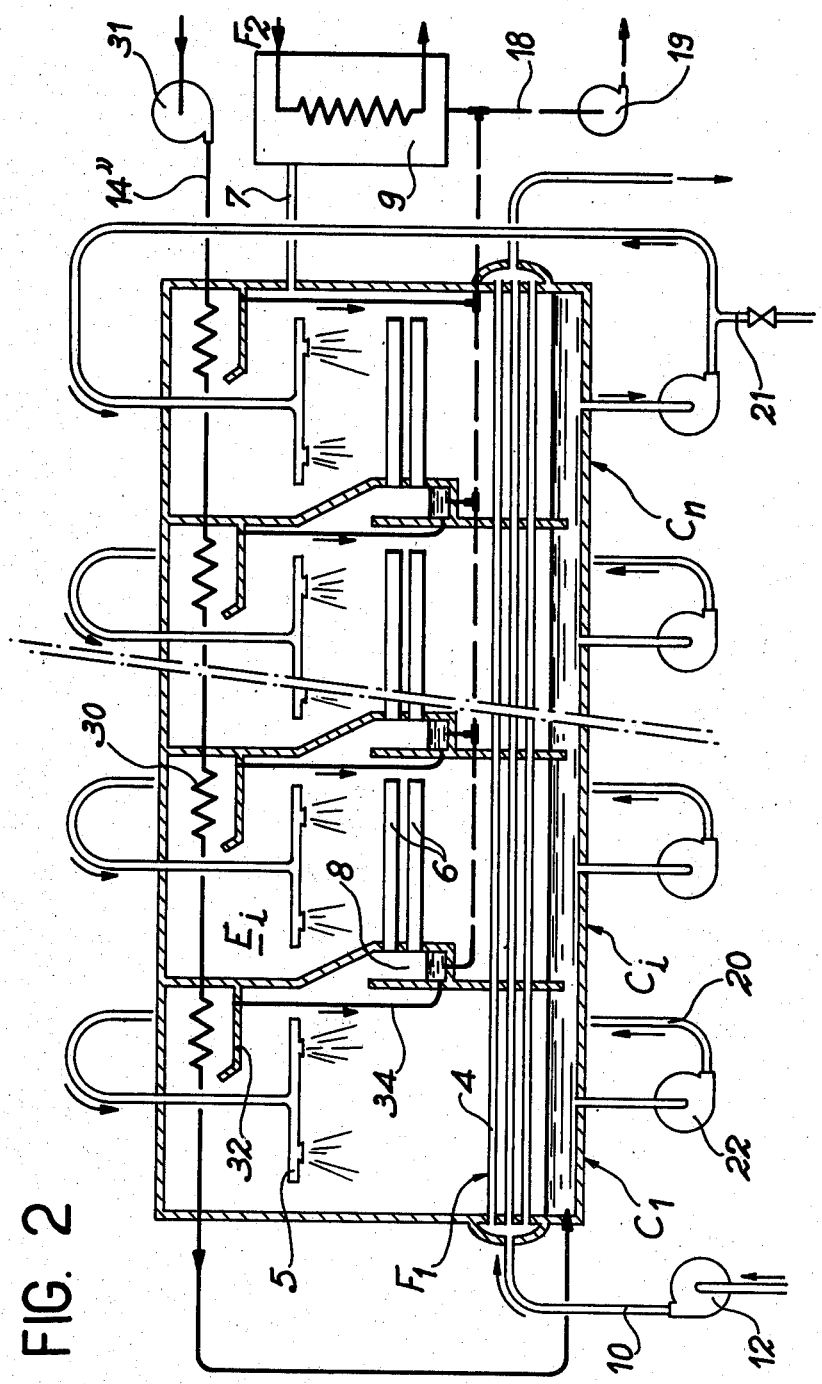
FIG. 2 illustrates a second alternative embodiment of the installation according to the invention in which the auxiliary fluid and the solution are obtained from different sources.

In FIG. 2, there is shown an alternative embodiment of the installation of FIG. 1.

In this alternative form, the flow of fresh sea water supplied to the chambers is no longer constituted by a fraction of the flow of fluid $F_1$ supplied to the heat exchangers 4. In this case, the fresh sea water is preheated. To this end, the sea water is circulated within heat exchangers 30 provided in the upper portion of each chamber $C_1$. A pipe 14'' equipped with a pump 31 serves to supply the heat exchangers 30 in series from chamber $C_n$ to chamber $C_1$.

It is noted that, in this case, a small fraction of the vapor formed within one chamber is condensed in contact with the heat exchanger 30 provided within this latter.

In consequence, each chamber $C_i$ is equipped with a horizontal partition 32 which forms a plate or tray for collecting the condensate produced in contact with the heat exchanger 30.

The collecting plate or tray 32 of one chamber is connected by means of a pipe 34 to the lower portion of the chamber 8 for vapor distribution within the condenser of the following chamber.

It is readily apparent that the construction of a distillation installation in accordance with the invention is not limited to the alternative embodiments shown in FIGS. 1 and 2. It accordingly follows, for example, that only a fraction of the non-vaporized sea water of chamber $C_n$ could be recycled through a pipe 20 to the sprayer 5 of each chamber $C_i$.

We claim:

1. A multiple effect device for the distillation of a solution comprising:
   a plurality of chambers $C_1$ to $C_n$, forming multiple effects,
   means for feeding the solution into the chamber $C_1$,
   means for establishing a communication between said chambers $C_1$ to $C_n$ for flowing the non-vaporized solution in series from chamber $C_1$ to the chambers $C_2$ to $C_n$,
   means for heating the solution in chamber $C_1$, said means consisting of an heat exchanger in which an auxiliary fluid circulates, wherein said auxiliary fluid is constituted by heat rejections,
   means for heating the solution in each of the chambers $C_2$ to $C_n$, said means consisting of an heat exchanger in which said auxiliary fluid circulates and a condenser in which the vapor formed in the preceding chamber circulates,
   means for supplying in series the heat exchangers of chambers $C_1$ to $C_n$ with said auxiliary fluid,
   means for distributing the vapor formed in one of the chambers $C_1$ to $C_{n-1}$ within the condenser of the following chamber,
   means for distributing the vapor formed in chamber $C_n$ within a condenser cooled by a second fluid,
   means for contacting the solution in chamber $C_1$ with the surface of said heat exchanger;
   means for contacting the solution in each of the chambers $C_2$ to $C_n$ with the surfaces of said heat exchangers and said condensers, and means for recovering the condensate produced in the condensers.

2. A device according to claim 1, wherein the condensers are respectively located above said heat exchangers within each chamber $C_2$ to $C_n$.

3. A device according to claim 1, wherein the means for contacting said solution with the surface of said heat exchangers and of said condensers are means for establishing a flow of solution in the form of a thin film on the surface of said heat exchangers and of said condensers.

4. A device according to claim 3, wherein said means for establishing the flow of solution onto the surface of the heat exchangers and of the condensers comprise means for spraying onto said exchangers and condensers the solution which is introduced directly into each chamber.

5. A device according to claim 3, wherein said means for establishing the flow of solution on the surface of said heat exchangers and condensers comprise means for spraying onto said exchangers and condensers a fraction of the non-vaporized solution of at least one of the chambers.

6. A device according to claim 1, wherein the means for contacting said solution with the surface of said heat exchangers and of said condensers are means for establishing within the chambers a circulation of solution such that said exchangers and said condensers are completely immersed in said solution.

7. A device according to claim 6, wherein said means for establishing a circulation of solution within the chambers comprise means for recycling within the chambers a fraction of the non-vaporized solution of at least one of said chambers.

* * * * *